(12) United States Patent
Borlepawar

(10) Patent No.: US 11,485,197 B2
(45) Date of Patent: Nov. 1, 2022

(54) SYSTEM AND METHOD FOR PROVIDING AN AIR QUALITY ALERT TO AN OCCUPANT OF A HOST VEHICLE

(71) Applicant: Lear Corporation, Southfield, MI (US)

(72) Inventor: Sarika Borlepawar, Chinchwad Pune (IN)

(73) Assignee: LEAR CORPORATION, Southfield, MI (US)

( * ) Notice: Subject to any disclaimer, the term of this patent is extended or adjusted under 35 U.S.C. 154(b) by 371 days.

(21) Appl. No.: 16/817,699

(22) Filed: Mar. 13, 2020

(65) Prior Publication Data

US 2021/0283983 A1 Sep. 16, 2021

(51) Int. Cl.
*B60H 1/00* (2006.01)
*B60K 35/00* (2006.01)
(Continued)

(52) U.S. Cl.
CPC ......... *B60H 1/00985* (2013.01); *B60H 1/008* (2013.01); *B60K 35/00* (2013.01);
(Continued)

(58) Field of Classification Search
CPC ............... B60H 1/00985; B60H 1/008; B60H 1/00771; B60K 35/00; B60K 2370/1529; B60K 2370/592; E05F 15/71; E05F 15/72; H04W 4/40; H04W 4/02; E05Y 2400/45; E05Y 2900/55; E05Y 2800/42; G08B 25/10; G01N 33/0063; G01N 33/0073
See application file for complete search history.

(56) References Cited

U.S. PATENT DOCUMENTS 3,500,119 A 3/1970 Price
4,135,440 A 1/1979 Schmidt et al.
(Continued)

FOREIGN PATENT DOCUMENTS

CA 2568055 A1 3/2000
CN 101838973 A 9/2010
(Continued)

OTHER PUBLICATIONS

OnStar Public Safety, https://www.public-safety.onstar.com/emergency-situations/, last accessed Oct. 7, 2021, 9 pages.
(Continued)

*Primary Examiner* — Mussa A Shaawat
(74) *Attorney, Agent, or Firm* — Brooks Kushman P.C.

(57) ABSTRACT

A system and method are described for providing an air quality alert to an occupant of a host vehicle. The system includes a communication unit adapted to be mounted in the host vehicle and configured to receive a wireless vehicle-to-x communication comprising an air quality value associated with a geographic area outside the host vehicle. The system also includes a controller adapted to be mounted in the vehicle and provided in communication with the communication unit. The controller is configured to generate an air quality alert control signal operative to provide an air quality alert to the occupant of the host vehicle based on a relationship of the air quality value to an air quality threshold value.

20 Claims, 4 Drawing Sheets

(51) Int. Cl.
  *B60Q 9/00* (2006.01)
  *E05F 15/71* (2015.01)
  *H04W 4/40* (2018.01)

(52) U.S. Cl.
  CPC ............ *B60Q 9/00* (2013.01); *E05F 15/71* (2015.01); *H04W 4/40* (2018.02); *B60K 2370/1529* (2019.05); *E05Y 2400/45* (2013.01); *E05Y 2900/55* (2013.01)

(56) References Cited

U.S. PATENT DOCUMENTS

| | | | |
|---|---|---|---|
| 4,236,099 | A | 11/1980 | Rosenblum |
| 4,967,319 | A | 10/1990 | Seko |
| 5,451,820 | A | 9/1995 | Gotoh et al. |
| 5,739,756 | A * | 4/1998 | Margulies .......... B60H 1/00314 340/693.11 |
| 5,942,853 | A | 8/1999 | Piscart |
| 5,955,031 | A * | 9/1999 | King, Jr. ............... E05F 15/72 49/199 |
| 6,010,277 | A | 1/2000 | Follman |
| 6,097,023 | A | 8/2000 | Schofield et al. |
| 6,110,038 | A * | 8/2000 | Stern .................. F24F 11/77 454/343 |
| 6,208,256 | B1 * | 3/2001 | Fleming ............... E05F 15/72 180/271 |
| 6,448,888 | B1 * | 9/2002 | Horner ................ G08B 21/12 340/425.5 |
| 6,587,573 | B1 | 7/2003 | Stam et al. |
| 6,642,838 | B1 * | 11/2003 | Barnas ............. B60H 1/00735 340/425.5 |
| 6,877,929 | B1 | 4/2005 | Yang |
| 6,983,726 | B1 * | 1/2006 | Luo .................... F02N 11/0807 49/31 |
| 7,301,478 | B1 * | 11/2007 | Chinn ................... G08G 1/163 340/471 |
| 7,507,052 | B2 | 3/2009 | Griffiths |
| 7,565,006 | B2 | 7/2009 | Stam et al. |
| 7,566,851 | B2 | 7/2009 | Stein et al. |
| 7,609,150 | B2 | 10/2009 | Wheatley et al. |
| 7,645,090 | B2 | 1/2010 | Rastegar et al. |
| 8,186,905 | B2 | 5/2012 | Castro et al. |
| 8,688,376 | B2 | 4/2014 | Stahlin et al. |
| 8,946,990 | B1 | 2/2015 | Gupta |
| 8,970,358 | B2 | 3/2015 | Kiefer et al. |
| 9,035,797 | B2 | 5/2015 | Varma |
| 9,204,276 | B2 | 12/2015 | Hellwig et al. |
| 9,333,971 | B1 | 5/2016 | Han |
| 9,443,426 | B1 | 9/2016 | Formwalt |
| 9,555,736 | B2 | 1/2017 | Solar et al. |
| 9,558,659 | B1 | 1/2017 | Silver et al. |
| 9,689,121 | B2 | 6/2017 | Shi et al. |
| 9,713,956 | B2 | 7/2017 | Bark et al. |
| 9,729,636 | B2 | 8/2017 | Koravadi et al. |
| 9,731,645 | B1 | 8/2017 | Taleb-Bendiab |
| 9,758,016 | B1 * | 9/2017 | Baron .................. B60H 1/008 |
| 9,809,167 | B1 | 11/2017 | Badger, II |
| 9,824,581 | B2 | 11/2017 | Bhat et al. |
| 9,845,050 | B1 * | 12/2017 | Garza ................ H04W 4/38 |
| 9,896,106 | B1 | 2/2018 | Wrobel et al. |
| 9,937,860 | B1 | 4/2018 | Moradi-Pari et al. |
| 9,951,487 | B1 | 4/2018 | Gonzalez De Cosio Leal |
| 10,139,244 | B2 | 11/2018 | Schilling et al. |
| 10,217,344 | B2 * | 2/2019 | Gage .................. G08B 21/06 |
| 10,349,011 | B2 | 7/2019 | Du et al. |
| 10,484,848 | B2 | 11/2019 | Cavalcanti et al. |
| 10,565,874 | B1 | 2/2020 | Lei et al. |
| 10,575,151 | B2 | 2/2020 | Tawadrous et al. |
| 10,577,762 | B2 | 3/2020 | Abu Al-Rubb |
| 10,708,547 | B2 * | 7/2020 | Newman ............... G08G 1/0129 |
| 10,745,870 | B2 | 8/2020 | Xiang et al. |
| 11,203,442 | B2 * | 12/2021 | Miller ................... B64D 45/00 |
| 11,347,218 | B2 * | 5/2022 | Wang .................... H04W 4/44 |
| 2002/0080618 | A1 | 6/2002 | Kobayashi et al. |
| 2003/0016143 | A1 | 1/2003 | Ghazarian |
| 2003/0107323 | A1 | 6/2003 | Stam |
| 2003/0195704 | A1 | 10/2003 | Sekiguchi |
| 2005/0063779 | A1 | 3/2005 | Yang |
| 2006/0014611 | A1 | 1/2006 | Kitamura et al. |
| 2007/0276600 | A1 | 11/2007 | King et al. |
| 2008/0266396 | A1 | 10/2008 | Stein |
| 2009/0299549 | A1 | 12/2009 | Albertson |
| 2011/0298603 | A1 | 12/2011 | King et al. |
| 2012/0010044 | A1 | 1/2012 | Gibson et al. |
| 2012/0029730 | A1 | 2/2012 | Nagura et al. |
| 2012/0280806 | A1 | 11/2012 | Yu et al. |
| 2012/0282024 | A1 | 11/2012 | Hua |
| 2012/0293315 | A1 | 11/2012 | Schunder et al. |
| 2013/0188258 | A1 | 7/2013 | Mathieu et al. |
| 2013/0209169 | A1 | 8/2013 | Chew et al. |
| 2014/0222280 | A1 | 8/2014 | Salmonsson et al. |
| 2015/0003087 | A1 | 1/2015 | Futamura et al. |
| 2015/0042226 | A1 | 2/2015 | Hibino |
| 2015/0050906 | A1 | 2/2015 | Yuasa |
| 2015/0130643 | A1 | 5/2015 | Nagy |
| 2015/0167614 | A1 | 6/2015 | Malone et al. |
| 2015/0216021 | A1 | 7/2015 | Bennett et al. |
| 2015/0360601 | A1 | 12/2015 | Chambers et al. |
| 2015/0381751 | A1 | 12/2015 | Haran |
| 2016/0036917 | A1 | 2/2016 | Koravadi et al. |
| 2016/0185347 | A1 | 6/2016 | Lefevre et al. |
| 2016/0232414 | A1 | 8/2016 | Salmonsson et al. |
| 2016/0236611 | A1 | 8/2016 | Langkabel et al. |
| 2016/0266242 | A1 | 9/2016 | Gilliland et al. |
| 2016/0288699 | A1 | 10/2016 | Solar et al. |
| 2016/0318490 | A1 | 11/2016 | Ben Shalom |
| 2016/0343254 | A1 | 11/2016 | Rovik et al. |
| 2016/0363647 | A1 | 12/2016 | Zeng et al. |
| 2017/0018178 | A1 | 1/2017 | Poechmueller et al. |
| 2017/0025012 | A1 | 1/2017 | Thompson et al. |
| 2017/0028911 | A1 * | 2/2017 | Medenica ............. G08B 21/06 |
| 2017/0066374 | A1 | 3/2017 | Hoye |
| 2017/0101054 | A1 * | 4/2017 | Dusane ............ G08G 1/096741 |
| 2017/0113550 | A1 | 4/2017 | Li et al. |
| 2017/0113665 | A1 | 4/2017 | Mudalige et al. |
| 2017/0132935 | A1 | 5/2017 | Xu et al. |
| 2017/0206426 | A1 | 7/2017 | Schrier et al. |
| 2017/0214747 | A1 | 7/2017 | Schulte et al. |
| 2017/0217421 | A1 | 8/2017 | Theodosis et al. |
| 2017/0350360 | A1 | 12/2017 | Tedesco et al. |
| 2017/0369055 | A1 | 12/2017 | Seigusa et al. |
| 2018/0129215 | A1 | 5/2018 | Hazelton et al. |
| 2018/0174449 | A1 | 6/2018 | Nguyen |
| 2018/0222391 | A1 | 8/2018 | Chen |
| 2018/0253613 | A1 | 9/2018 | Fung et al. |
| 2018/0253968 | A1 | 9/2018 | Yalla |
| 2018/0281771 | A1 | 10/2018 | Ito et al. |
| 2018/0297470 | A1 | 10/2018 | Kim |
| 2018/0312164 | A1 | 11/2018 | Sasabuchi |
| 2019/0018419 | A1 | 1/2019 | Lee et al. |
| 2019/0031207 | A1 | 1/2019 | Nakamura |
| 2019/0066490 | A1 | 2/2019 | Skvarce |
| 2019/0202256 | A1 * | 7/2019 | Brower .................... B60H 1/24 |
| 2019/0266875 | A1 * | 8/2019 | Herring .................. G08B 21/14 |
| 2019/0364402 | A1 | 11/2019 | Lee |
| 2019/0394625 | A1 | 12/2019 | Kim et al. |
| 2020/0062074 | A1 | 2/2020 | Macneille et al. |
| 2020/0092694 | A1 | 3/2020 | Chen et al. |
| 2020/0096359 | A1 | 3/2020 | Sakr et al. |
| 2020/0100167 | A1 | 3/2020 | Cheng et al. |
| 2020/0192355 | A1 | 6/2020 | Lu |
| 2020/0198444 | A1 * | 6/2020 | Schmidt ............... B60H 3/0035 |
| 2020/0211372 | A1 | 7/2020 | Nabrotsky |
| 2020/0236521 | A1 | 7/2020 | Vassilovski et al. |
| 2020/0238786 | A1 * | 7/2020 | Murphy ............. B60H 1/00821 |
| 2020/0263372 | A1 | 8/2020 | Nastev |
| 2020/0380868 | A1 | 12/2020 | Bhunia et al. |
| 2020/0398637 | A1 * | 12/2020 | Chang .................... G08B 21/02 |
| 2020/0398640 | A1 * | 12/2020 | Chang ................ B60H 1/00792 |
| 2021/0009027 | A1 | 1/2021 | Mulligan |
| 2021/0027629 | A1 | 1/2021 | Tao et al. |
| 2021/0197865 | A1 | 7/2021 | Zhou et al. |

(56) References Cited

U.S. PATENT DOCUMENTS

| | | |
|---|---|---|
| 2021/0304592 A1 | 9/2021 | Lepp et al. |
| 2022/0017032 A1 | 1/2022 | Qi et al. |
| 2022/0030408 A1 | 1/2022 | Zhang et al. |

FOREIGN PATENT DOCUMENTS

| | | |
|---|---|---|
| CN | 102310747 A | 1/2012 |
| CN | 102785666 A | 11/2012 |
| CN | 103759385 A | 4/2014 |
| CN | 103760310 A | 4/2014 |
| CN | 104709271 A | 6/2015 |
| CN | 105862616 A | 8/2016 |
| CN | 108320500 A | 7/2018 |
| CN | 108755480 A | 11/2018 |
| CN | 108839610 A | 11/2018 |
| CN | 110761208 A | 2/2020 |
| CN | 111284394 A | 6/2020 |
| DE | 19756574 A1 | 10/1998 |
| DE | 10164193 A1 | 7/2002 |
| DE | 10239150 A1 | 10/2003 |
| DE | 102012200040 A1 | 7/2013 |
| DE | 102012200048 A1 | 7/2013 |
| EP | 1451038 A1 | 9/2004 |
| EP | 1504956 A2 | 2/2005 |
| EP | 3093193 A1 | 11/2016 |
| EP | 3109095 A1 | 12/2016 |
| EP | 3343095 A1 | 7/2018 |
| EP | 3343097 A1 | 7/2018 |
| JP | 200431179 A | 10/2004 |
| KR | 20150134793 A | 12/2015 |
| KR | 20160050270 A | 5/2016 |
| KR | 20180076209 A | 7/2018 |
| WO | 2013102524 A1 | 7/2013 |
| WO | 2013102526 A1 | 7/2013 |
| WO | 2016046209 A1 | 3/2016 |
| WO | 2016203911 A1 | 12/2016 |
| WO | 2017036807 A1 | 3/2017 |
| WO | 2017073250 A1 | 5/2017 |
| WO | 2017141395 A1 | 8/2017 |

OTHER PUBLICATIONS

Code of Federal Regulations, Title 49, vol. 6, Part 571, Federal Motor Vehicle Safety Standards, 2014, https://www.govinfo.gov/app/details/CFR-2014-title49-vol6/CFR-2014-title49-vol6-part571, Retrieved Jul. 27, 2021, 4 Pages.

Department of Transportation, National Highway Traffic Safety Administration, 49 CFR Part 571, Federal Motor Vehicle Safety Standards—V2V Communications, Notice of Proposed Rulemaking, Federal Register, vol. 82, No. 8, Jan. 12, 2017, Proposed Rules, https://www.federalregister.gov/documents/2017/01/12/2016-31059/federal-motor-vehicle-safety-standards-v2v-communications, 166 Pages.

ITE, "Traffic Calming Measures," Institute of Transportation Engineers, Archived from the original on Mar. 20, 2007, URL: https://web.archive.org/web/20170729064350/http:/1www.ite.org/traffic/hump.asp, Retrieved May 29, 2020, 2 Pages.

R. Miucic, A. Sheikh, Z. Medenica and R. Kunde, "V2X Applications Using Collaborative Perception," 2018 IEEE 88th Vehicular Technology Conference (VTC-Fall), Chicago, IL, USA, 2018, 6 pages.

Society of Automotive Engineers, SAE J2945/1, On-Board System Requirements for V2V Safety Communications, Mar. 2016, 127 Pages (in 2 parts).

Wikipedia, "eCall," url: https://en.wikipedia.org/wiki/Ecall, last edited Jul. 4, 2021, accessed Jul. 12, 2021, 5 Pages.

U.S. National Highway Transportation Safety Administration (NHTSA), "Event Data Recorder," url: https://www.nhtsa.gov/research-data/event-data-recorder#overview-10516, accessed Jul. 12, 2021, 4 Pages.

Allyn, Bobby, "Apple iPhones Can Soon Hold Your ID. Privacy Experts are on Edge," NPR, Jun. 12, 2021, url: https://www.npr.org/2021/06/12/1005624457/apple-iphones-can-soon-hold-your-id-privacy-experts-are-on-edge, last accessed Sep. 2, 2021, 13 Pages.

Lee, Alicia, "Tell Siri you're getting pulled over and this iPhone shortcut will record your interaction with the police," CNN, Jun. 16, 2020, url: https://www.cnn.com/2020/06/16/us/iphone-police-shortcut-record-trnd/index.html, last accessed Sep. 2, 2021, 6 Pages.

Elassar, Alaa, "The ACLU created an app to help people record police misconduct," CNN, May 31, 2020, url: https://www.cnn.com/2020/05/31/us/aclu-mobile-justice-police-misconduct-app/index.html, last accessed Sep. 2, 2021, 3 Pages.

1st Chinese Office Action, No English Translation available—listing of references provided in English Only.

CN102310747A, English Abstract and Machine Translation.

CN102785666A, English Abstract and U.S. Equivalent U.S. Pub. No. 2012/0293315.

CN103759385A, English Abstract and Machine Translation.

CN103760310A, English Abstract and Machine Translation.

First Office Action for Chinese Patent Application No. 202110113226.2, dated May 16, 2022, 11 Pages.

* cited by examiner

SYSTEM AND METHOD FOR PROVIDING AN AIR QUALITY ALERT TO AN OCCUPANT OF A HOST VEHICLE

TECHNICAL FIELD

The following relates to a system and method for providing an air quality alert to an occupant of a host vehicle using V2X communications.

BACKGROUND

Air pollution is one of the most challenging problems in the world today when the atmosphere is polluted due to gaseous and particulates emissions from different anthropogenic sources such as industrial, domestic and vehicular activities. Such air pollution may have negative effects on human health, such as increased mortality, hospital admissions, and various cardiovascular and respiratory diseases. For example, air pollution in India is estimated to kill 1.5 million people every year, making it the fifth largest killer in India. According to the United Nations World Health Organization, India has the highest death rate in the world from chronic respiratory diseases and asthma.

Air pollution has thus come under increasing scrutiny in recent years, particularly in areas where residents complain of smog and respiratory problems. In such areas, residents may be advised not to venture outside to reduce the negative health effects of air pollution. Air pollution control agency may also appeal to residents to wear face masks when venturing outside during days or times having low air quality.

In that regard, the Office of Air Quality Planning and Standards at the United States Environmental Protection Agency has developed an air quality index (AQI). The AQI is an index for reporting daily air quality. The AQI is designed to inform the public of how clean or, conversely, how unhealthy the ambient air may be in a given geographic area.

Vehicle-to-everything (V2X) communication is the passing of information from a vehicle to any entity that may affect the vehicle or its occupants, and vice versa. V2X is a vehicular communication system that incorporates or includes other more specific types of communication such as Vehicle-to-Infrastructure (V2I), Vehicle-to-Network (V2N), Vehicle-to-Vehicle (V2V), Vehicle-to-Pedestrian (V2P), and Vehicle-to-Device (V2D). The main motivations for V2X communication are road safety, traffic efficiency, and energy savings, as well as vehicle occupant safety, information, and comfort.

One type of V2X communication technology is Dedicated Short Range Communication (DSRC) Wireless Local Area Network (WLAN) based. Another type of V2X communication technology is cellular based, which may also be referred to as Cellular Vehicle-to-everything (CV2X). V2X communication may use WLAN technology and work directly between vehicles, which form a vehicular ad-hoc network as two V2X transmitters come within each range of each other. Hence it does not necessarily require any infrastructure for vehicles to communicate, which is key to assure safety in remote or little developed areas.

WLAN is particularly well-suited for V2X communication, due to its low latency. It transmits messages known as Cooperative Awareness Messages (CAM) and Decentralized Environmental Notification Messages (DENM) or Basic Safety Message (BSM). The data volume of these messages is very low. The radio technology is part of the WLAN 802.11 family of standards developed by the Institute of Electrical and Electronics Engineers (IEEE) and known in the United States as Wireless Access in Vehicular Environments (WAVE) and in Europe as ITS-G5.

A need therefore exists for a system and method capable of automatically providing an air quality alert to an occupant of a host vehicle that would utilize data from V2X communications. Such a system and method would receive a wireless vehicle-to-x communication comprising an air quality value associated with a geographic area within a predetermined distance from the host vehicle, and generate an air quality alert control signal operative to provide an air quality alert to the occupant of the host vehicle based on a relationship of the air quality value to an air quality threshold value.

SUMMARY

According to one non-limiting exemplary embodiment described herein, a system is provided for providing an air quality alert to an occupant of a host vehicle. The system comprises a communication unit adapted to be mounted in the host vehicle and configured to receive a wireless vehicle-to-x communication comprising an air quality value associated with a geographic area outside the host vehicle. The system further comprises a controller adapted to be mounted in the vehicle and provided in communication with the communication unit. The controller is configured to generate an air quality alert control signal operative to provide an air quality alert to the occupant of the host vehicle based on a relationship of the air quality value to an air quality threshold value.

According to another non-limiting exemplary embodiment described herein, a method is provided for providing an air quality alert to an occupant of a host vehicle. The method comprises receiving a wireless vehicle-to-x communication comprising an air quality value associated with a geographic area outside the host vehicle. The method further comprises generating an air quality alert control signal operative to provide an air quality alert to the occupant of the host vehicle based on a relationship of the air quality value to an air quality threshold value.

According to yet another non-limiting exemplary embodiment described herein, a non-transitory computer readable storage medium is provided having stored computer executable instructions for providing an air quality alert to an occupant of a host vehicle comprising a controller and a communication unit configured to receive a wireless vehicle-to-x communication comprising an air quality value associated with a geographic area outside the host vehicle. The computer executable instructions are configured to cause the controller to generate an air quality alert control signal operative to provide an air quality alert to the occupant of the host vehicle based on a relationship of the air quality value to an air quality threshold value.

A detailed description of these and other non-limiting exemplary embodiments of a system, method, and non-transitory computer readable storage medium for providing an air quality alert to an occupant of a host vehicle is set forth below together with the accompanying drawings.

DETAILED DESCRIPTION

Figure 1:
FIG. 1 is an exemplary Air Quality Index (AQI) table for use with a system and method for providing an air quality alert to an occupant of a host vehicle according to non-limiting exemplary embodiments to the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

With reference to FIGS. 1-4, a more detailed description of non-limiting exemplary embodiments of a system and method for providing an air quality alert to an occupant of a host vehicle will be provided. For ease of illustration and to facilitate understanding, like reference numerals have been used herein for like components and features throughout the drawings.

As previously described, air pollution is one of the most challenging problems in the world today when the atmosphere is polluted due to gaseous and particulates emissions from different anthropogenic sources such as industrial, domestic and vehicular activities. Air pollution has thus come under increasing scrutiny in recent years, particularly in areas where residents complain of smog and respiratory problems. Such air pollution may adversely affect human health, such as increased mortality, hospital admissions, and various cardiovascular and respiratory diseases. In such areas, residents may be advised not to venture outside to reduce the negative health effects of air pollution. Air pollution control agency may also appeal to residents to wear face masks when venturing outside during days or times having low air quality. In that regard, the Office of Air Quality Planning and Standards at the United States Environmental Protection Agency has developed an air quality index (AQI). The AQI is an index for reporting daily air quality. The AQI is designed to inform the public of how clean or, conversely, how unhealthy the ambient air may be in a given geographic area.

As also previously described, vehicle-to-everything (V2X) communication is the passing of information from a vehicle to any entity that may affect the vehicle, and vice versa. V2X is a vehicular communication system that incorporates or includes other more specific types of communication such as Vehicle-to-Infrastructure (V2I), Vehicle-to-Network (V2N), Vehicle-to-Vehicle (V2V), Vehicle-to-Pedestrian (V2P), and Vehicle-to-Device (V2D). V2X communication is designed to improve road safety, traffic efficiency, and energy savings, as well as vehicle occupant safety, information, and comfort, and may be implemented using Dedicated Short Range Communication (DSRC) Wireless Local Area Network (WLAN) technology, or cellular technology, which may also be referred to as Cellular Vehicle-to-everything (CV2X). V2X communication may use WLAN technology and work directly between vehicles, which form a vehicular ad-hoc network as two V2X transmitters come within each range of each other. Hence it does not require any infrastructure for vehicles to communicate, which can improve safety in remote or little developed areas. WLAN is particularly well-suited for V2X communication, due to its low latency. It transmits messages known as Cooperative Awareness Messages (CAM) and Decentralized Environmental Notification Messages (DENM) or Basic Safety Message (BSM). The data volume of these messages is very low. The radio technology is part of the WLAN 802.11 family of standards developed by the Institute of Electrical and Electronics Engineers (IEEE) and known in the United States as Wireless Access in Vehicular Environments (WAVE) and in Europe as ITS-G5.

The system and method of the present disclosure automatically provide an air quality alert to occupant of a host vehicle using data from V2X communications. The system and method of the present disclosure receive a wireless vehicle-to-x communication comprising an air quality value associated with a geographic area outside, such as within a predetermined distance from, the host vehicle, and generate an air quality alert control signal operative to provide an air quality alert to the occupant of the host vehicle based on a relationship of the air quality value to an air quality threshold value. The system and method of the present disclosure thereby allow host vehicle occupants, especially those with respiratory or cardiovascular problems, to decide whether to take precautions to reduce the negative health effects of air pollution, such as by wearing a mask when venturing outside the host vehicle or avoiding a geographic area having poor air quality. The geographic area with which the air quality value is associated may be an area that includes an intended route of the host vehicle, as for instance obtained from a planned navigation route of the host vehicle. The geographic area may alternatively be an area within a predetermined distance from the host vehicle or within a predetermined projected time of travel from the host vehicle. The projected time of travel may be inferred, for instance, by a navigation system of the vehicle which knows the vehicle's intended route and estimated likely speed(s) while travelling the route.

Referring now to FIG. 1, an exemplary Air Quality Index (AQI) table is shown for use with a system and method for providing an air quality alert to an occupant of a host vehicle according to non-limiting exemplary embodiments to the present disclosure. In that regard, the table may represent an AQI developed by the Office of Air Quality Planning and Standards at the United States Environmental Protection Agency, or any other agency or organization. As seen therein, a variety of AQI levels 4 of health concern may be provided, which may be referred to as "Good," "Moderate," "Unhealthy for Sensitive Groups," "Unhealthy," "Very Unhealthy," and "Hazardous." As also seen therein, each of the qualitative levels 4 of health concern may have an associated meaning or description 6, as well as an associated numerical value 8. The associated numerical values 8 may represent or reflect quantitative determinations of air quality based on any type of known measurement or testing systems or methodologies.

Figure 2:
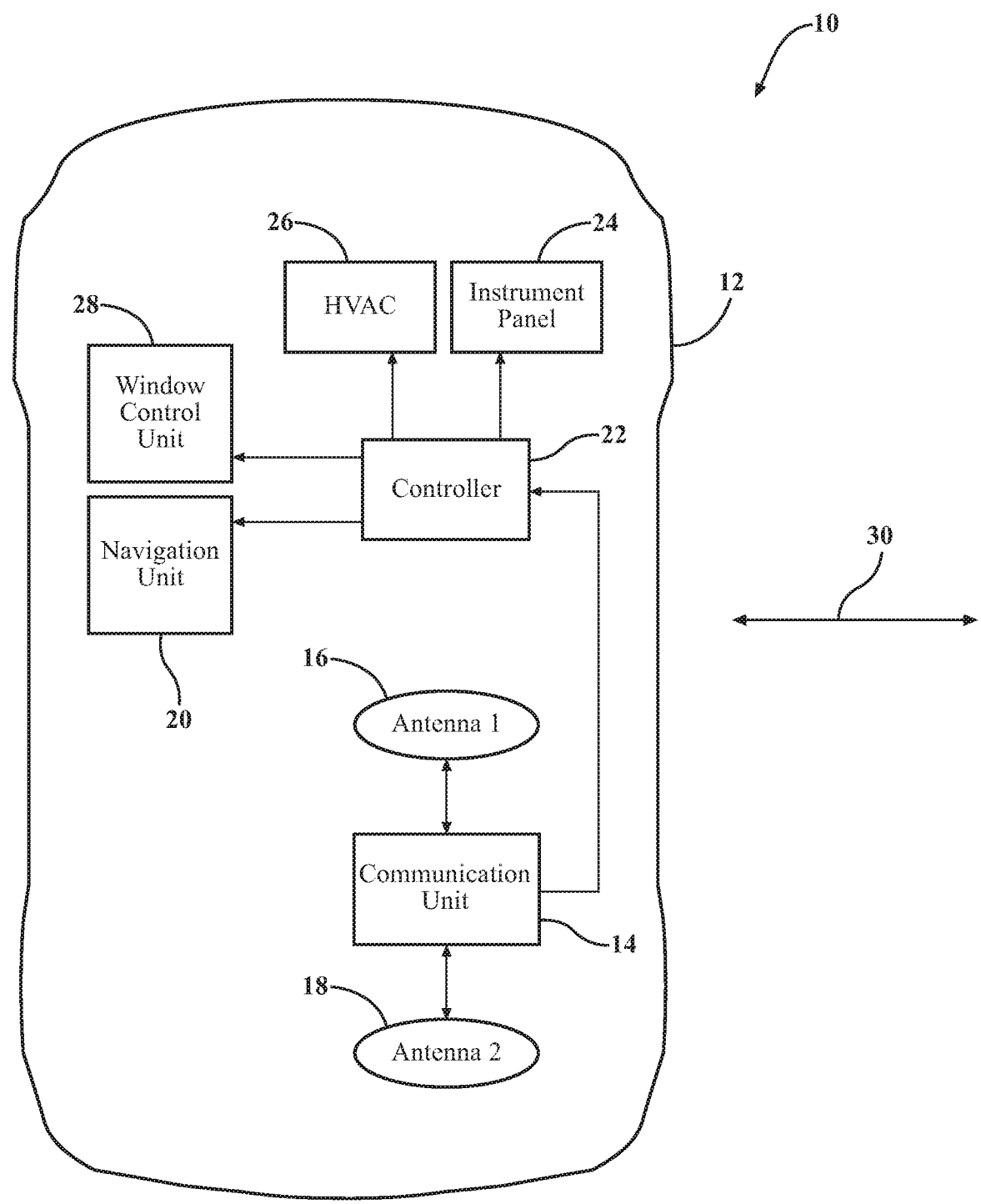
FIG. 2 is a simplified block diagram of a system for providing an air quality alert to an occupant of a host vehicle according to one non-limiting exemplary embodiment of the present disclosure.

Referring next to FIG. 2, a simplified block diagram of a system 10 for providing an air quality alert to an occupant of a host vehicle 12 according to one non-limiting exemplary embodiment of the present disclosure is shown. As seen therein, the host vehicle 12 may comprise a communication unit 14 for providing V2X communication. The communication unit 14 may be provided in communication with a first antenna 16 (Antenna1) for wireless DSRC V2X communication and a second antenna 18 (Antenna2) for wireless cellular V2X communication. Such communication between the communication unit 14 and the first and second antennas 16, 18 may be provided over any vehicle bus, such as a Controller Area Network (CAN) bus.

The communication unit 14 of the host vehicle 12 may be configured to enable and control communication between the host vehicle 12 and other similarly equipped vehicles (i.e., V2V communication) or between the host vehicle 12 and another node or device (e.g., Vehicle-to-Infrastructure (V2I) communication, Vehicle-to-Network (V2N) communication, Vehicle-to-Pedestrian (V2P) communication, or Vehicle-to-Device (V2D) communication). Such communication is accomplished utilizing radio frequency signals for transmission of data according to known techniques, protocols, and/or standards associated with such communication. In that regard, the first and/or second antennas 16, 18 of the host vehicle 12 may be configured for transmitting and receiving DSRC WLAN or cellular radio frequency signals.

The host vehicle 12 may also comprise a controller 22, which may be provided in communication with the communication unit 14, a vehicle instrument panel including a display 24, a vehicle Heating, Ventilation, and Air Conditioning (HVAC) control unit 26, a vehicle window control unit 28, and a navigation system or unit 20, which may include a Global Positioning System (GPS) or other similar system. The controller 22 may be configured to communicate signals to the instrument panel 24, the HVAC control unit 26, the window control unit 28, and/or the navigation unit 20 to provide an air quality alert and/or to effectuate control of the instrument panel display, the vehicle HVAC system, the vehicle windows, and/or the navigation unit 20. Such communication between the controller 22, the instrument panel 24, the HVAC control unit 26, the window control unit 28, and the navigation unit 20, may be provided over any vehicle bus, such as a Controller Area Network (CAN) bus.

Figure 3:
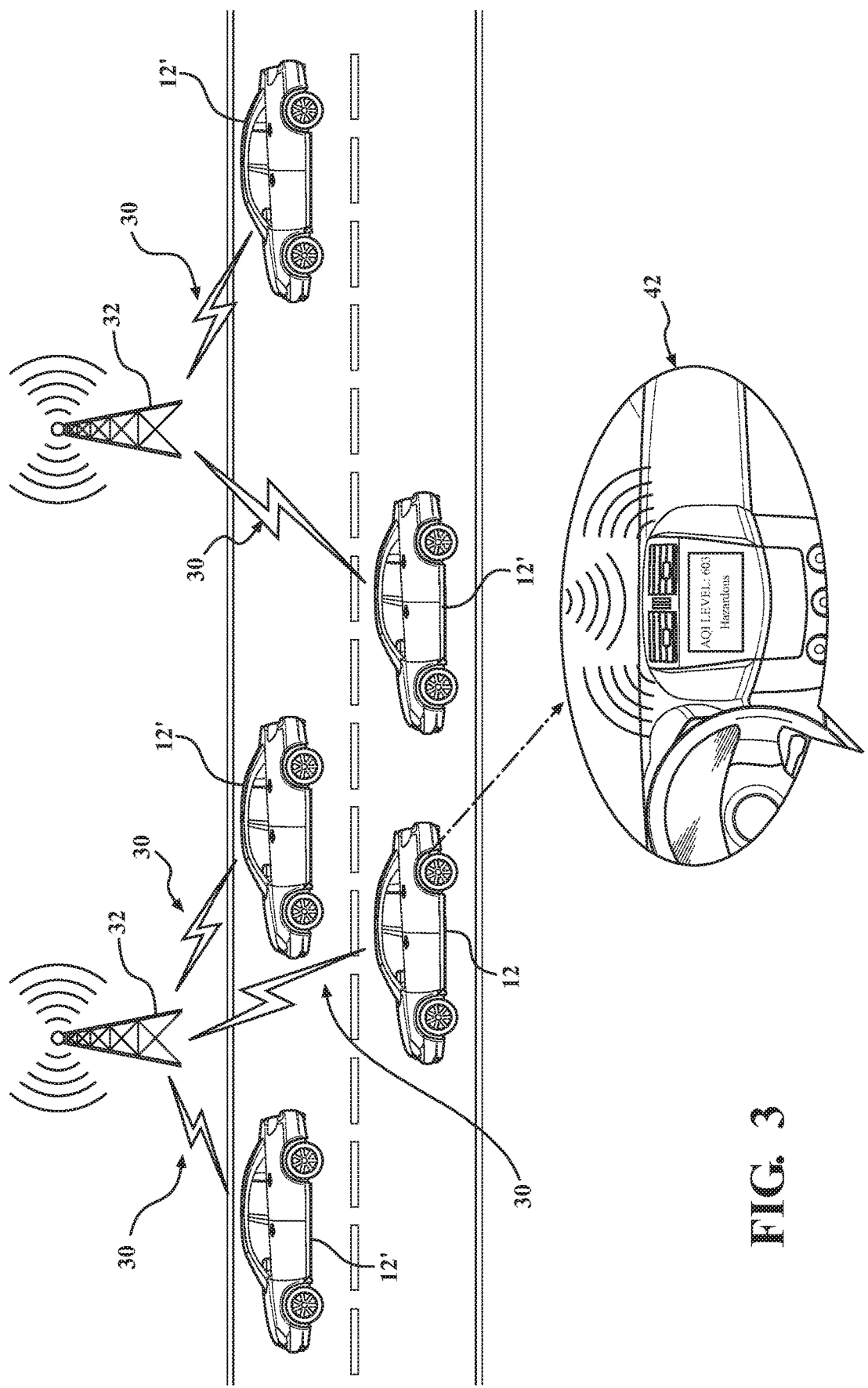
FIG. 3 is an illustration of one example of V2X communication in a system and method for providing an air quality alert to an occupant of a host vehicle according to non-limiting exemplary embodiments to the present disclosure.
Figure 4:
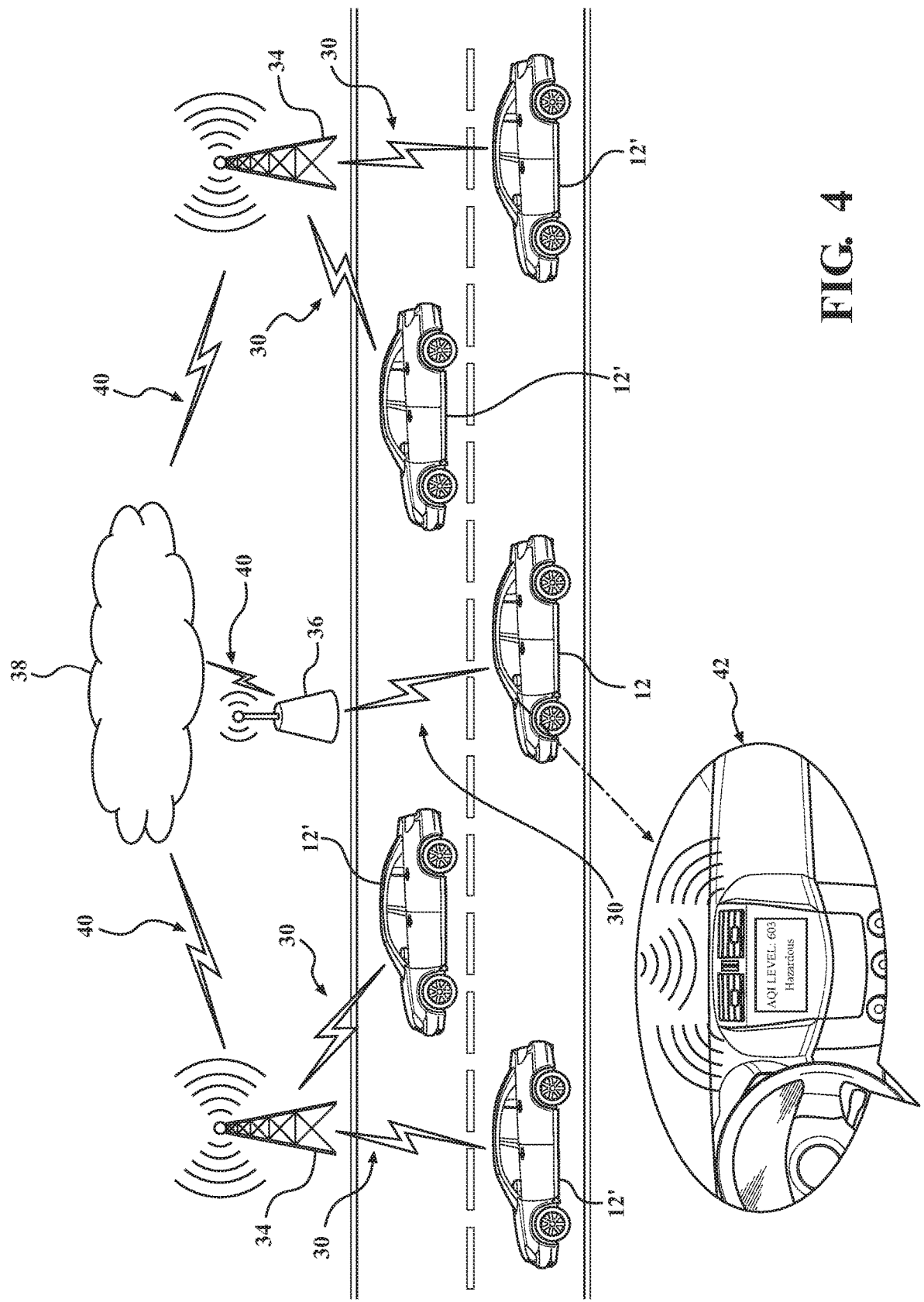
FIG. 4 is an illustration of another example of V2X communication in a system and method for providing an air quality alert to an occupant of a host vehicle according to non-limiting exemplary embodiments to the present disclosure.

Referring next to FIGS. 3 and 4, examples of V2X communication in a system and/or method for providing an air quality alert to an occupant of a host vehicle according to non-limiting exemplary embodiments to the present disclosure are shown. As seen therein, and with continuing reference to FIGS. 1 and 2, the communication unit 14 of the host vehicle 12 may be configured to enable and control wireless V2X communication 30 between the host vehicle 12 and a node or device such as an infrastructure transmitter/receiver 32, a cellular base station 34, and/or a roadside unit 36 (e.g., Vehicle-to-Infrastructure (V2I) communication, Vehicle-to-Network (V2N) communication, or Vehicle-to-Device (V2D) communication). In that regard, the infrastructure transmitter/receiver 32, the cellular base station 34, and/or the roadside unit 36 may also be configured for communication with each other over ad-hoc or established networks, such as the internet 38, which communication may be wireless communications 40, wired communications (not shown), or a combination of both.

Such V2X communication is accomplished utilizing radio frequency signals for transmission of data according to known techniques, protocols, and/or standards associated with such communication. Once again, the first and/or second antennas 16, 18 of the host vehicle 12 may be configured for transmitting and receiving DSRC WLAN or cellular radio frequency signals. As previously noted, the communication unit 14 of the host vehicle 12 may also be configured to enable and control wireless V2X communication between the host vehicle 12 and other similarly equipped vehicles 12' (i.e., V2V communication (not shown)).

With continuing reference to FIGS. 1-4, the present disclosure thus provides a system 10 for providing an air quality alert to an occupant of a host vehicle 12. The system 10 may comprise a communication unit 14 adapted to be mounted in the host vehicle 12 and configured to receive a wireless V2X communication 30 comprising an air quality value associated with a geographic area within a predetermined distance from the host vehicle 12. In that regard, it should be noted that any predetermined distance may be utilized, such as 5 miles, 25 miles, 100 miles, or any other distance. Moreover, the air quality value may be a numerical value 8 from an AQI and may represent or reflect a quantitative determination of air quality based on any type of known measurement or testing systems or methodologies and which may be provided by a local agency, organization, or authority for inclusion in V2X transmissions.

The system 10 may further comprise a controller 22 adapted to be mounted in the host vehicle 12 and provided in communication with the communication unit 14. The controller 22 may be configured to generate an air quality alert control signal operative to provide an air quality alert to the occupant of the host vehicle 12 based on a relationship of the received air quality value to an air quality threshold value. In that regard, such a relationship may take, for example, the form of the received air quality value exceeding or being greater than an air quality threshold value where air quality numerical values 8 increase with decreasing air quality, such as shown in the AQI of FIG. 1. Alternative, such a relationship may take the form of the received air quality value failing to exceed, falling below, or being less than an air quality threshold value where air quality numerical values decrease with decreasing air quality, such as may be reflected in an alternative air quality index (not shown) to that of FIG. 1. The controller 22 may have associated storage for storing an air quality threshold value and/or AQI information and the controller 22 may be configured to compare the received air quality value to the stored air quality threshold value and/or the AQI information.

The air quality alert may comprise a graphical display 42 on the instrument panel 24 visible to the occupant of the host vehicle 12. In that regard, as seen in FIGS. 3 and 4, a graphical display 42 on the instrument panel 24 of the host vehicle 12 illustrates an AQI numerical value 8 of 603 and an AQI level 4 of "Hazardous." Alternatively, such a graphical display 42 may be provided on/in a head-up display system (not shown) of the host vehicle. In addition, or alternatively, the air quality alert may comprise a lighted warning lamp on the instrument panel 24 or another interior vehicle component visible to an occupant of the host vehicle 12, an audible tone or message, and/or haptic feedback to an occupant from a vehicle seat or steering wheel.

As previously described, the wireless V2X communication 30 may comprise, for example, a Vehicle-to-Infrastructure (V2I) communication, a Vehicle-to-Vehicle (V2V) communication, a Vehicle-to-Pedestrian (V2P) communication, a Vehicle-to-Network (V2N) communication, or a Vehicle-to-Device (V2D) communication. As also previously described, the wireless V2X communication 30 may comprise a Dedicated Short Range Communication (DSRC) signal or a cellular communication signal.

The controller 22 may be further configured to generate a window control signal, which may be communicated to the window control unit 28 and may be operative to effectuate automatic closure of a host vehicle window having an open state based on the relationship of the air quality value to an air quality threshold value. The controller 22 may be further configured to generate a climate control system control signal, which may be communicated to the HVAC control unit 26 and may be operative to effectuate automatic control of a host vehicle climate control system to a state in which cabin air is recirculated within the vehicle (rather than drawing air from outside the vehicle) based on the relationship of the air quality value to an air quality threshold value. The controller 22 may be further configured to provide the air quality alert signal to the navigation system 20, which may be configured to plan a route for the host vehicle 12 to avoid the geographic area having poor air quality in response to the air quality alert signal.

The controller 22 may be further configured to halt generation of the air quality alert control signal to thereby halt effectuation of the air quality alert to the occupant of the host vehicle 12 based on receipt of an updated air quality value and a relationship of the updated air quality value to the air quality threshold value. Once again, such a relationship may take, for example, the form of the received updated air quality value exceeding or being greater than an air quality threshold value where air quality numerical values 8 increase with decreasing air quality, such as shown in the AQI of FIG. 1. Alternative, such a relationship may take the form of the received updated air quality value failing to exceed, falling below, or being less than an air quality threshold value where air quality numerical values decrease with decreasing air quality, such as may be reflected in an alternative air quality index (not shown) to that of FIG. 1.

As those skilled in the art will understand, the communication unit 14, antennas 16, 18, navigation unit 20, controller 22, instrument panel 24, HVAC control unit 26, window control unit 28, as well as any other controller, control unit, system, subsystem, unit, module, interface, sensor, device, component, or the like described herein may individually, collectively, or in any combination comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithm or algorithms represented by the various functions and/or operations described herein, including interaction between and/or cooperation with each other. One or more of such processors, as well as other circuitry and/or hardware, may be included in a single Application-Specific Integrated Circuitry (ASIC), or several processors and various circuitry and/or hardware may be distributed among several separate components, whether individually packaged or assembled into a System-on-a-Chip (SoC). The communication unit 14 and the controller 22 may therefore comprise a processor and an associated storage medium having stored computer executable instructions for performing the particular algorithm or algorithms represented by the various functions and/or operations described herein.

Referring still to FIGS. 1-4, the present disclosure thus also provides a method for providing an air quality alert to an occupant of a host vehicle 12. The method may comprise receiving a wireless V2X communication 30 comprising an air quality value associated with a geographic area within a predetermined distance from the host vehicle. The method may further comprise generating an air quality alert control signal operative to provide an air quality alert to the occupant of the host vehicle 12 based on a relationship of the air quality value to an air quality threshold value. In that regard, such a relationship may take, for example, the form of the received air quality value exceeding or being greater than an air quality threshold value where air quality numerical values 8 increase with decreasing air quality, such as shown in the AQI of FIG. 1. Alternative, such a relationship may take the form of the received air quality value failing to exceed, falling below, or being less than an air quality threshold value where air quality numerical values decrease with decreasing air quality, such as may be reflected in an alternative air quality index (not shown) to that of FIG. 1.

The air quality alert may again comprise a graphical display 42 on the instrument panel 24 visible to the occupant of the host vehicle 12. In that regard, as seen in FIGS. 3 and 4, a graphical display 42 on the instrument panel 24 of the host vehicle 12 illustrates an AQI numerical value 8 of 603 and an AQI level 4 of "Hazardous." Alternatively, such a graphical display 42 may be provided on/in a head-up display system (not shown) of the host vehicle. In addition, or alternatively, the air quality alert may comprise a lighted warning lamp on the instrument panel 24 or another interior vehicle component visible to an occupant of the host vehicle 12, an audible tone or message, and/or haptic feedback to an occupant from a vehicle seat or steering wheel.

As described previously, the wireless V2X communication 30 may comprise, for example, a Vehicle-to-Infrastructure (V2I) communication, a Vehicle-to-Vehicle (V2V) communication, a Vehicle-to-Pedestrian (V2P) communication, a Vehicle-to-Network (V2N) communication, or a Vehicle-to-Device (V2D) communication. As also described previously, the wireless V2X communication 30 may comprise a Dedicated Short Range Communication (DSRC) signal or a cellular communication signal.

The method may further comprise generating, such as by the controller 22, a window control signal operative to effectuate automatic closure of a host vehicle window having an open state based on the relationship of the air quality value to an air quality threshold value. The method may further comprise generating, such as by the controller 22, a climate control system control signal operative to effectuate automatic control of a host vehicle climate control system to a cabin air recirculation state based on the relationship of the air quality value to an air quality threshold value. The method may further comprise providing, such as by the controller 22, the air quality alert signal to a host vehicle navigation system configured to plan a route for the host vehicle to avoid the geographic area in response to the air quality alert signal.

The method may further comprise halting, such as by the controller 22, generation of the air quality alert control signal to thereby halt effectuation of the air quality alert to the occupant of the host vehicle based on receipt of an updated air quality value and a relationship of the updated air quality value to the air quality threshold value. As previously described, such a relationship may take, for example, the form of the received updated air quality value exceeding or being greater than an air quality threshold value where air quality numerical values 8 increase with decreasing air quality, such as shown in the AQI of FIG. 1. Alternative, such a relationship may take the form of the received updated air quality value failing to exceed, falling below, or being less than an air quality threshold value where air quality numerical values decrease with decreasing air quality, such as may be reflected in an alternative air quality index (not shown) to that of FIG. 1.

Still referring to FIGS. 1-4, the system 10 and method of the present disclosure may be implemented by or in a non-transitory computer readable storage medium having stored computer executable instructions for providing an air quality alert to an occupant of a host vehicle 12 comprising a controller 22 and a communication unit 14 configured to receive a wireless V2X communication 30 comprising an air quality value associated with a geographic area within a predetermined distance from the host vehicle 12. The computer executable instructions may be configured to cause the controller 22 to generate an air quality alert control signal operative to provide an air quality alert to the occupant of the host vehicle 12 based on a relationship of the air quality value to an air quality threshold value. In that regard, such a relationship may take, for example, the form of the received air quality value exceeding or being greater than an air quality threshold value where air quality numerical values 8 increase with decreasing air quality, such as shown in the AQI of FIG. 1. Alternative, such a relationship may take the form of the received air quality value failing to exceed, falling below, or being less than an air quality threshold value where air quality numerical values decrease with decreasing air quality, such as may be reflected in an alternative air quality index (not shown) to that of FIG. 1.

The air quality alert may again comprise a graphical display 42 on the instrument panel 24 visible to the occupant of the host vehicle 12. In that regard, as seen in FIGS. 3 and 4, a graphical display 42 on the instrument panel 24 of the host vehicle 12 illustrates an AQI numerical value 8 of 603 and an AQI level 4 of "Hazardous." Alternatively, such a graphical display 42 may be provided on/in a head-up display system (not shown) of the host vehicle. In addition, or alternatively, the air quality alert may comprise a lighted warning lamp on the instrument panel 24 or another interior vehicle component visible to an occupant of the host vehicle 12, an audible tone or message, and/or haptic feedback to an occupant from a vehicle seat or steering wheel.

As described previously, the wireless V2X communication 30 may comprise, for example, a Vehicle-to-Infrastructure (V2I) communication, a Vehicle-to-Vehicle (V2V) communication, a Vehicle-to-Pedestrian (V2P) communication, a Vehicle-to-Network (V2N) communication, a Vehicle-to-Device (V2D) communication. As also described previously, the wireless V2X communication 30 may comprise a Dedicated Short Range Communication (DSRC) signal or a cellular communication signal.

The computer executable instructions may further comprise instructions configured to cause the controller 22 to generate a window control signal operative to effectuate automatic closure of a host vehicle window having an open state based on the relationship of the air quality value to an air quality threshold value. The computer executable instructions may further comprise instructions configured to cause the controller 22 to generate a climate control system control signal operative to effectuate automatic control of a host vehicle climate control system to a cabin air recirculation state based on the relationship of the air quality value to an air quality threshold value. The computer executable instructions may further comprise instructions configured to cause the controller 22 to provide the air quality alert signal to a host vehicle navigation system configured to plan a route for the host vehicle to avoid the geographic area in response to the air quality alert signal.

The computer executable instructions may further comprise instructions configured to cause the controller 22 to halt generation of the air quality alert control signal to thereby halt effectuation of the air quality alert to the occupant based on receipt of an updated air quality value and a relationship of the updated air quality value to the air quality threshold value. As previously described, such a relationship may take, for example, the form of the received updated air quality value exceeding or being greater than an air quality threshold value where air quality numerical values 8 increase with decreasing air quality, such as shown in the AQI of FIG. 1. Alternative, such a relationship may take the form of the received updated air quality value failing to exceed, falling below, or being less than an air quality threshold value where air quality numerical values decrease with decreasing air quality, such as may be reflected in an alternative air quality index (not shown) to that of FIG. 1.

The present disclosure thus describes a system, method, and non-transitory computer readable storage medium capable of automatically providing an air quality alert to occupant of a host vehicle that utilizes data from V2X communications. The system, method, and non-transitory computer readable storage medium of the present disclosure receive a wireless vehicle-to-x communication comprising an air quality value associated with a geographic area within a predetermined distance from the host vehicle, and generate an air quality alert control signal operative to provide an air quality alert to the occupant of the host vehicle in response based on a relationship of the air quality value to an air quality threshold value. The system and method of the present disclosure thereby allow host vehicle occupants, especially those with respiratory or cardiovascular problems, to decide whether to take precautions to reduce the negative health effects of air pollution, such as by wearing a mask when venturing outside the host vehicle or avoiding a geographic area having poor air quality.

As is readily apparent from the foregoing, various non-limiting embodiments of a system, method, and non-transitory computer readable storage medium for providing an air quality alert to an occupant of a host vehicle have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A system for providing an air quality alert to an occupant of a host vehicle, the system comprising:
 a communication unit adapted to be mounted in the host vehicle and configured to receive a wireless vehicle-to-x communication comprising an air quality value associated with a geographic area outside the host vehicle; and
 a controller adapted to be mounted in the host vehicle and provided in communication with the communication unit, wherein the controller is configured to generate an air quality alert control signal operative to provide an air quality alert to the occupant of the host vehicle based on a relationship of the air quality value to an air quality threshold value;
 wherein the geographic area is within a predetermined projected time of travel from the host vehicle based on an intended route of the host vehicle stored by a navigation system of the host vehicle and an estimated likely speed of the host vehicle on the intended route.

2. The system of claim 1 wherein the geographic area includes an intended route of the host vehicle.

3. The system of claim 1 wherein the geographic area is within a predetermined distance from the host vehicle.

4. The system of claim 1 wherein the air quality alert comprises a graphical display on an instrument panel or a head-up display system of the host vehicle.

5. The system of claim 1 wherein the wireless vehicle-to-x communication comprises a vehicle-to-vehicle communication, a vehicle-to-infrastructure communication, a vehicle-to-pedestrian communication, a vehicle-to-network communication, or a vehicle-to-device communication.

6. The system of claim 1 wherein the wireless vehicle-to-x communication comprises a dedicated short range communication signal or a cellular communication signal.

7. The system of claim 1 wherein the controller is further configured to generate a window control signal operative to effectuate automatic closure of a host vehicle window having an open state based on the relationship of the air quality value to an air quality threshold value.

8. The system of claim 1 wherein the controller is further configured to generate a climate control system control signal operative to effectuate automatic control of a host vehicle climate control system to a cabin air recirculation state based on the relationship of the air quality value to an air quality threshold value.

9. The system of claim 1 wherein the controller is further configured to halt generation of the air quality alert control signal to halt effectuation of the air quality alert to the occupant based on receipt of an updated air quality value and a relationship of the updated air quality value to the air quality threshold value.

10. The system of claim 1 wherein the controller is further configured to provide the air quality alert signal to a host vehicle navigation system configured to plan a route for the host vehicle to avoid the geographic area in response to the air quality alert signal.

11. A method for providing an air quality alert to an occupant of a host vehicle, the method comprising:
   receiving a wireless vehicle-to-x communication comprising an air quality value associated with a geographic area outside the host vehicle; and
   generating an air quality alert control signal operative to provide an air quality alert to the occupant of the host vehicle based on a relationship of the air quality value to an air quality threshold value;
   wherein the geographic area is within a predetermined projected time of travel from the host vehicle based on an intended route of the host vehicle stored by a navigation system of the host vehicle and an estimated likely speed of the host vehicle on the intended route.

12. The method of claim 11 wherein the geographic area includes an intended route of the host vehicle.

13. The method of claim 11 wherein the geographic area is within a predetermined distance from the host vehicle.

14. The method of claim 11 wherein the air quality alert comprises a graphical display on an instrument panel or a head-up display system of the host vehicle.

15. The method of claim 11 wherein the wireless vehicle-to-x communication comprises a vehicle-to-vehicle communication, a vehicle-to-infrastructure communication, a vehicle-to-pedestrian communication, a vehicle-to-network communication, or a vehicle-to-device communication.

16. The method of claim 11 further comprising generating a window control signal operative to effectuate automatic closure of a host vehicle window having an open state based on the relationship of the air quality value to an air quality threshold value.

17. The method of claim 11 further comprising generating a climate control system control signal operative to effectuate automatic control of a host vehicle climate control system to a cabin air recirculation state based on the relationship of the air quality value to an air quality threshold value.

18. The method of claim 11 further comprising halting generation of the air quality alert control signal to halt effectuation of the air quality alert to the occupant of the host vehicle based on receipt of an updated air quality value and a relationship of the updated air quality value to the air quality threshold value.

19. The method of claim 11 further comprising providing the air quality alert signal to a host vehicle navigation system configured to plan a route for the host vehicle to avoid the geographic area in response to the air quality alert signal.

20. A non-transitory computer readable storage medium having stored computer executable instructions for providing an air quality alert to an occupant of a host vehicle comprising a controller and a communication unit configured to receive a wireless vehicle-to-x communication comprising an air quality value associated with a geographic area outside the host vehicle, the computer executable instructions configured to cause the controller to:
   generate an air quality alert control signal operative to provide an air quality alert to the occupant of the host vehicle based on a relationship of the air quality value to an air quality threshold value;
   wherein the geographic area is within a predetermined projected time of travel from the host vehicle based on an intended route of the host vehicle stored by a navigation system of the host vehicle and an estimated likely speed of the host vehicle on the intended route.

* * * * *